United States Patent
Liu et al.

(10) Patent No.: US 10,852,187 B2
(45) Date of Patent: Dec. 1, 2020

(54) RAMAN SPECTRUM DETECTION APPARATUS AND METHOD BASED ON IMAGE GRAYSCALE RECOGNITION

(71) Applicant: Nuctech Company Limited, Beijing (CN)

(72) Inventors: Haihui Liu, Beijing (CN); Hongqiu Wang, Beijing (CN); Jianhong Zhang, Beijing (CN); Jiaqian Zuo, Beijing (CN)

(73) Assignee: Nuctech Company Limited, Beijing (CN)

( * ) Notice: Subject to any disclaimer, the term of this patent is extended or adjusted under 35 U.S.C. 154(b) by 55 days.

(21) Appl. No.: 16/313,690

(22) PCT Filed: Dec. 19, 2018

(86) PCT No.: PCT/CN2018/122123
§ 371 (c)(1),
(2) Date: Jan. 14, 2019

(87) PCT Pub. No.: WO2019/128808
PCT Pub. Date: Jul. 4, 2019

(65) Prior Publication Data
US 2019/0219446 A1    Jul. 18, 2019

(30) Foreign Application Priority Data

Dec. 26, 2017   (CN) .......................... 2017 1 1442746

(51) Int. Cl.
*G01F 3/28*   (2006.01)
*G01J 3/28*   (2006.01)
(Continued)

(52) U.S. Cl.
CPC .......... *G01J 3/2823* (2013.01); *G01J 3/4412* (2013.01); *G01J 5/025* (2013.01); *G01N 21/65* (2013.01);
(Continued)

(58) Field of Classification Search
CPC .. G01J 3/2823; G01J 3/44; G01J 5/025; G01J 2005/0081; G01J 1/00; G01J 2005/0085; G01J 5/0066; G01N 21/65; H04N 5/33
See application file for complete search history.

(56) References Cited

U.S. PATENT DOCUMENTS

| | | | |
|---|---|---|---|
| 7,224,825 B2 * | 5/2007 | Craig ................. | G01N 15/0211 356/336 |
| 2008/0099678 A1 * | 5/2008 | Johnson ................. | G01J 5/025 250/332 |

(Continued)

FOREIGN PATENT DOCUMENTS

| | | | | |
|---|---|---|---|---|
| CN | 106770176 A | | 5/2017 | |
| CN | 206479455 | * | 9/2017 | ................ G01J 5/00 |

OTHER PUBLICATIONS

Anna Malarski, "Laser sheet dropsizing based on two-dimensional Raman and Mie scattering", Applied Optics 2009 (Year: 2009).*

(Continued)

*Primary Examiner* — Maurice C Smith
(74) *Attorney, Agent, or Firm* — Schwegman Lundberg & Woessner, P.A.

(57) ABSTRACT

The disclosure provides a Raman spectrum detection apparatus, including: a laser configured to emit laser light to an object to be detected; a Raman spectrometer configured to receive Raman light from the object; an imaging device configured to obtain an image of the object; and a controller configured to control an operation of the detection apparatus (Continued)

based on grayscales of the image. There is further provided a Raman spectrum detection method.

20 Claims, 2 Drawing Sheets

(51) Int. Cl.
*G01J 3/44* (2006.01)
*G01N 21/65* (2006.01)
*G01J 5/02* (2006.01)
G01J 5/00 (2006.01)
H04N 5/33 (2006.01)

(52) U.S. Cl.
CPC ..... *G01J 5/0066* (2013.01); *G01J 2005/0081* (2013.01); *G01J 2005/0085* (2013.01); *H04N 5/332* (2013.01)

(56) References Cited

U.S. PATENT DOCUMENTS

| | | |
|---|---|---|
| 2015/0168367 A1 | 6/2015 | Gardner et al. |
| 2018/0180551 A1 | 6/2018 | Zhang et al. |
| 2020/0088645 A1 | 3/2020 | Zhang et al. |

OTHER PUBLICATIONS

"European Application Serial No. 18826176.2, Extended European Search Report dated Oct. 15, 2020", (Oct. 15, 2020), 7 pgs.

* cited by examiner

RAMAN SPECTRUM DETECTION APPARATUS AND METHOD BASED ON IMAGE GRAYSCALE RECOGNITION

PRIORITY APPLICATIONS

This application is a U.S. National Stage Filing under 35 U.S.C. 371 from International Application No. PCT/CN2018/122123, filed on Dec. 27, 2018, and published as WO2019/128808 on Jul. 4, 2019, which claims the priority benefit of the Chinese Patent Application No. 201711442746.8, filed on Dec. 26, 2017; the benefit of priority of each of which is hereby claimed herein, and which applications and publication are hereby incorporated herein by reference in their entirety.

TECHNICAL FIELD

Embodiments of the present disclosure generally relate to a detection apparatus and a detection method, and particularly, to Raman spectrum detection apparatus and method based on image grayscale recognition.

DESCRIPTION OF THE RELATED ART

Raman spectrum analysis technology is a non-contact spectrum analysis technology based on Raman scattering effect, which can qualitatively and quantitatively analyze the composition of a substance. Raman spectrum is a molecular vibration spectrum that can reflect the fingerprint characteristics of molecules, and can be used for the inspection of substance. Raman spectrometer can inspect and identify the substance by the Raman spectrum generated from the Raman scattering effect of the object to be inspected with respect to exciting light.

In recent years, Raman spectrum analysis technology has been widely used in the fields of dangerous goods inspection and substance identification. In the field of substance identification, because the colors and shapes of various substances are different from each other, it is usually hard for a person to accurately determine the properties of the substance. Raman spectrum is determined by the molecular energy level structure of the object to be inspected, thus the Raman spectrum can be used as the "fingerprint" information of a substance for substance identification. Therefore, Raman spectrum analysis technology has been widely used in the fields of customs, public safety, food & medicine, environment, etc.

Laser having a high power density is generally used as an exciting light source in Raman spectrum detection, for example, near infrared laser light of 785 nm has a stronger thermal effect, thus in case that components of the object to be detected are not known, an indiscreet detection made by using such laser light may possibly cause the object to be detected to be burned and damaged by the laser light. If the object to be detected is a flammable and explosive chemical, such indiscreet detection may lead to burning, exploding and the like, resulting in personal and property loss.

SUMMARY

An object of the present disclosure is to at least partly solve or alleviate at least one aspect of the above-mentioned and other disadvantages or problems in prior arts.

According to an aspect of the present disclosure, there is provided a Raman spectrum detection apparatus based on image grayscale recognition.

According to an exemplary embodiment, the detection apparatus may comprise: a laser configured to emit laser light to an object to be detected; an imaging device configured to obtain an image of the object; a Raman spectrometer configured to receive Raman light coming from the object and generated under irradiation of the laser light so as to obtain a Raman spectrum of the object; and a controller configured to control a detection operation of the detection apparatus based on grayscales of the image.

According to another embodiment, the controller may be further configured to: determine, based on the image, a grayscale value of each of pixels of the image; compare the grayscale value of each of the pixels with a preset grayscale threshold; and control the detection operation of the detection apparatus based on a comparison result.

According to another embodiment, the controller is further configured to: determine a percentage of the number of the pixels, grayscale values of which are smaller than the grayscale threshold, with respect to a total pixel number of the image; and compare the determined percentage with a preset percentage threshold, and control the detection operation of the detection apparatus based on a comparison result.

According to another embodiment, the controller may be further configured to: determine, based on the image, a grayscale value of each of pixels of the image; calculate an average grayscale value of all pixels of the image based on the grayscale values of the pixels; and compare the average grayscale value with a preset average grayscale threshold, and control the detection operation of the detection apparatus based on a comparison result.

According to a further embodiment, the detection apparatus may further comprise: a first beam splitter disposed in a Raman light path from the object to the Raman spectrometer, and configured to guide the laser light emitted from the laser to the object and to transmit therethrough the Raman light from the object to the Raman spectrometer. According to a further embodiment, the first beam splitter may include a long-wavelength pass dichroic mirror.

According to a further embodiment, a second beam splitter disposed in a Raman light path from the object to the Raman spectrometer, and configured to reflect visible light from the object to the imaging device such that the object is imaged by the imaging device and to allow the laser light emitted from the laser and the Raman light from the object to pass therethrough. According to a further embodiment, the second beam splitter may include a long-wavelength pass dichroic mirror.

According to a further embodiment, the detection apparatus may further comprise at least one of following optical members: a first optical filter disposed in the Raman light path at a position downstream of the first beam splitter and the second beam splitter, and configured to filter out Rayleigh light of a light signal; a second optical filter disposed between the laser and the first beam splitter and configured to limit a wavelength of the laser light emitted by the laser within a desired wavelength band; and a third optical filter disposed between the imaging device and the second beam splitter and configured to filter out laser light from the object.

According to a further embodiment, the detection apparatus may further comprise at least one of following optical members: a first convergent lens or lens set disposed between the second beam splitter and the object; a second convergent lens or lens set disposed between the imaging device and the second beam splitter; and a third convergent lens or lens set disposed between the Raman spectrometer and the first beam splitter.

It is noted that each of the first to third convergent lenses or lens sets described herein may include a single convex lens as shown in the drawings, or may include a lens set composed of a plurality of lens and having a light converging function.

According to a further embodiment, the detection apparatus may further comprise a light source configured to illuminate the object.

According to another aspect of the present disclosure, there is provided a method of detecting a Raman spectrum of an object based on image grayscale recognition.

According to an exemplary embodiment, the method may comprise: obtaining an image of an object to be detected; determining a grayscale value of each of pixels of the image, determining, based on grayscale values of the pixels of the image, whether or not the object is adaptive to a Raman spectrum detection to be implemented by irradiating the object by laser light; implementing the Raman spectrum detection if it is determined the object is adaptive to the Raman spectrum detection; and if it is determined the object is not adaptive to the Raman spectrum detection, terminating the Raman spectrum detection, or adjusting a detection parameter for the Raman spectrum detection such that the object is adaptive to the Raman spectrum detection with the adjusted detection parameter.

According to another embodiment, the step of determining, based on grayscale values of the pixels of the image, whether or not the object is adaptive to a Raman spectrum detection to be implemented by irradiating the object by laser light may comprise: comparing the grayscale value of each of the pixels with a preset grayscale threshold so as to determine a deep-colored pixel percentage of the image, which is a percentage of the number of the pixels with grayscale values smaller than the grayscale threshold, with respect to a total pixel number of the image; and comparing the deep-colored pixel percentage with a preset percentage threshold, and concluding that the object is not adaptive to the Raman spectrum detection if the deep-colored pixel percentage is larger than the threshold percentage, and that the object is adaptive to the Raman spectrum detection if the deep-colored pixel percentage is smaller than or equal to the threshold percentage.

According to another embodiment, the step of determining, based on grayscale values of the pixels of the image, whether or not the object is adaptive to a Raman spectrum detection to be implemented by irradiating the object by laser light may comprise: calculating an average grayscale value of all pixels of the image; and comparing the average grayscale value with a preset average grayscale threshold, and concluding that the object is not adaptive to the Raman spectrum detection if the average grayscale value is smaller than the average grayscale value, and that the object is adaptive to the Raman spectrum detection if the average grayscale value is greater than or equal to the average grayscale value.

According to another embodiment, the method may further comprise: sending an alarm signal if it is determined that the object is not adaptive to the Raman spectrum detection.

According to another embodiment, adjusting a detection parameter for the Raman spectrum detection includes: reducing light emitting power of the laser for generating the laser light; and/or shortening a time period of the laser for continuously emitting the laser light.

BRIEF DESCRIPTION OF THE DRAWINGS

Exemplary embodiments of the present disclosure will be described as examples with reference to the accompanying drawings, in which.

DETAILED DESCRIPTION OF EXEMPLARY EMBODIMENTS

Figure 1:
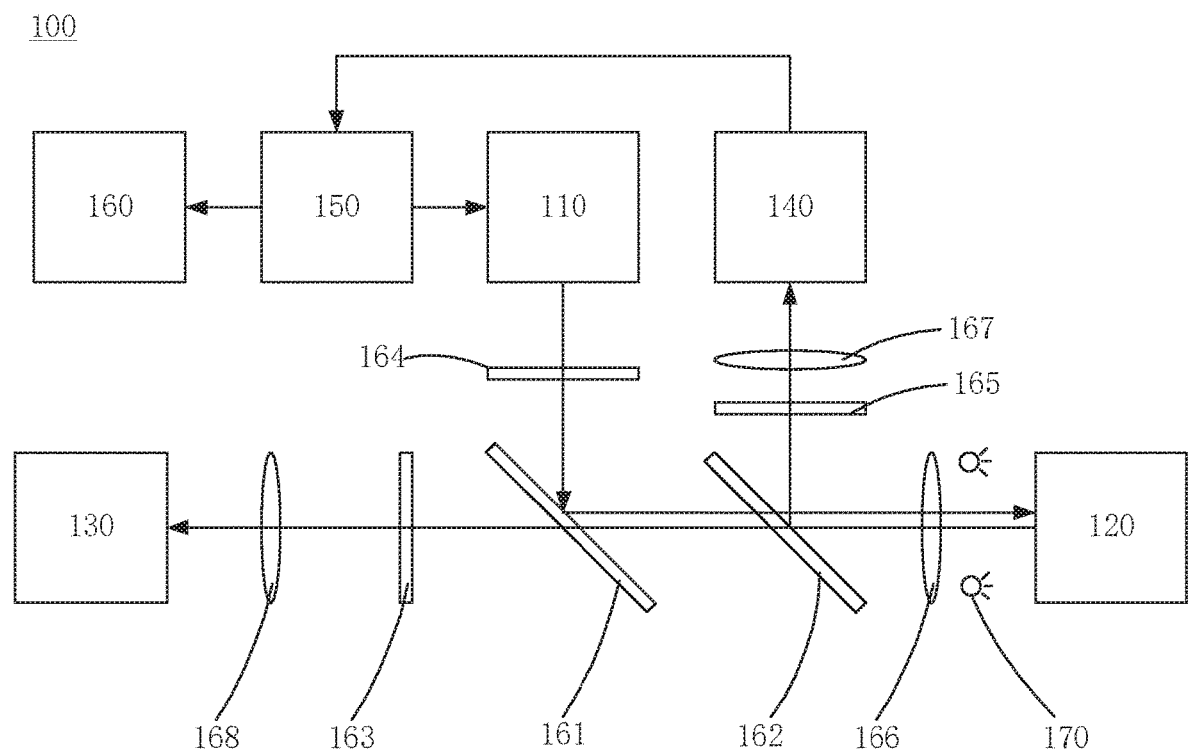
FIG. 1 is a block diagram schematically showing a detection apparatus according to an embodiment of the present disclosure.

Exemplary embodiments of the present disclosure will be described hereinafter in detail with reference to the attached drawings. Throughout the description, like reference numerals refer to like elements. The present disclosure may, however, be embodied in many different forms and should not be construed as being limited to the embodiments set forth herein; rather, these embodiments are provided so that the present disclosure will be thorough and complete, and will fully convey the concept of the disclosure to those skilled in the art.

According to a general inventive concept of the present disclosure, there is provided a detection apparatus, comprising: a laser configured to emit laser light to an object to be detected; a Raman spectrometer configured to receive Raman light from the object; an imaging device configured to obtain an image of the object; and a controller configured to control an operation of the detection apparatus based on grayscales of the image.

FIG. 1 is a schematic diagram of a detection apparatus according to an embodiment of the present disclosure. As shown in FIG. 1, in this embodiment, a detection apparatus 100 comprises: a laser 110 configured to emit laser light 111 towards an object 120 to be detected; a Raman spectrometer 130 configured to receive a Raman light signal 112 generated from the object 120 under the irradiation of the laser light; an imaging device 140 configured to obtain or capture an image of the object 120; and a controller 150 configured to control an operation of the detection apparatus 100 based on grayscales of the image In order to excite Raman scattering effect from an object to be detected, laser light emitted by a laser generally has a higher power density, which will generate a stronger thermal effect; if the color of the object to be detected is deeper (for example, dark gray, black or the like), the object will absorb more laser light and thereby increase rapidly in its surface temperature, which may cause the object to be partially ablated, or even exploded if the object is gunpower. If an inspector is inadequately trained or careless, the above phenomena may occur, or even the field inspector may be damaged. In order to avoid the above phenomena, technique schemes of the present disclosure provide an imaging device for obtaining an image of the object to be detected, such as an optical image, determine whether or not the object to be detected is deep colored or black, and determine a subsequent detection operation based on the determined color shade of the object.

The imaging device 140 may include a CCD imaging device, a CMOS imaging device or other known imaging devices or a light sensor. The image of the object may be an image of the whole of the object obtained in a certain direction, or an image of a detected portion of the object, which depends on the dimensions of the object 120 to be detected, parameters of the detection apparatus 100 such as a detection area, For example, if the object to be detected is a gemstone having a very small size, the imaging device may obtain an image of the whole of one side face of the object; if the object to be detected has a larger size, the imaging device may image partially a portion to be detected of the object. Herein, "color of an object" may be a color of the whole of a detected face of the object, or may be a color of a partial part of the detected portion of the object.

In embodiments of the present disclosure, a color shade of an object may be determined according to grayscales of an image of the object. According to an exemplary embodiment, the controller 150 is configured to: determine, based on the image obtained by the imaging device 140, a grayscale value of each of pixels of the image, compare the grayscale value of each of the pixels with a preset grayscale threshold, and control the detection operation of the detection apparatus based on a comparison result. In some examples, the controller 150 may determine a percentage of the number of the pixels, grayscale values of which are smaller than the grayscale threshold, relative to a total pixel number of the image, compare the determined percentage with a preset percentage threshold, and control the detection operation of the detection apparatus 100 based on a comparison result.

For example, a grayscale processing operation may be made by using an image processor on the image of the object obtained by the imaging device, so as to obtain the grayscale value (a value from 0 to 255) of each of pixels of the image. In an example, the image processor may be integrated into the imaging device 140 (that is, the imaging device 140 comprises the image processor); in another example, the image processor may also be integrated into the controller 150 (that is, the controller 150 comprises the image processor); in other examples, the image processor may also be provided in a field operated computer or in a remote control center. In an alternative embodiment, grayscale processing of the images of the object to be detected may be implemented by software or algorithms stored in a storage device of a field operated computer, of a computer in a remote control center or of the controller 150 so as to obtain grayscale values of respective pixels of the image.

Generally, a smaller grayscale value represents that the object has a deeper color, thus the grayscale threshold may be set based on actual conditions or requirements. For example, in an exemplary embodiment, the grayscale threshold may be set as 30, more or less. The controller 150 may compare the grayscale value of each of the pixels in the image of object with the preset grayscale threshold, so as to determine a percentage (hereinafter referred to as "deep-colored pixel percentage") of the number of the pixels, grayscale values of which are smaller than the grayscale threshold, relative to a total pixel number of the image. It will be understood that if the grayscale values of all or most of the pixels are smaller than the grayscale threshold, it shows that the color of the object appearing on the image is deeper. The threshold percentage may be set according to actual requirements (For example, the threshold percentage is set as 85%, 90% or 95%), and the deep-colored pixel percentage determined in above step may be compared with the threshold percentage, so that the detection apparatus 100 is controlled based on the comparison result.

For example, in case that the threshold percentage is set as 85%, if the controller 150 determines that the grayscale values of 85% or more of the pixels in the image are smaller than the grayscale threshold (that is, the deep-colored pixel percentage is greater than or equal to 85%), the controller 150 can conclude that the object to be detected has a deeper color and is not adaptive to a detection operation, and then instruct the laser 110 to not emit laser light, to reduce a light emitting power of the laser, to shorten a time period of the laser for continuously emitting the laser light, or to terminate the detection operation. In a further embodiment, the detection apparatus 100 may further comprise an alarm device 160, and the controller 150 may be further configured to control an operation of the alarm device 160 based on the comparison result between the deep-colored pixel percentage and the threshold percentage. For example, if the controller 150 determines that the deep-colored pixel percentage is greater than the threshold percentage, it may instruct the alarm device 160 to send an alarm signal so as to warn a related operator that the current object to be detected is not adaptive to be detected due to its deeper color and/or that the current detection operation has been terminated. The alarm signal may include at least of a special acoustical signal and an image signal.

If the deep-colored pixel percentage is smaller than or equal to the threshold percentage, the controller 150 may conclude that the color shade of the current object to be detected is adaptive to a detection operation. In such a case, the controller 150 may instruct the laser 110 to emit laser light, for implementing subsequent detection operation.

According to another exemplary embodiment, the controller 150 may also be configured to: determine, based on the image, a grayscale value of each of pixels of the image; calculate an average grayscale value of all pixels of the image based on the grayscale values of the pixels; and compare the average grayscale value with a preset average grayscale threshold, and control the detection operation of the detection apparatus based on a comparison result.

For example, the average grayscale threshold may be set as 25 or may be set as other values according to actual requirements. If the average grayscale value of all pixels in the image is smaller than 25, the controller 150 may conclude the image, as a whole, has a deeper color and thus is not adaptive to a detection operation. In this case, the controller 150 may instruct the laser 110 to not emit laser light, to reduce a light emitting power of the laser, to shorten a time period of the laser for continuously emitting the laser light, or to terminate the detection operation, and meanwhile, may instruct the alarm device 160 to send an alarm signal so as to warn a related operator that the current object is not adaptive to be detected and/or that the detection operation has been terminated. If the average grayscale value is greater than or equal to the average grayscale threshold, the controller 150 may conclude the color shade of the object is adaptive to a detection operation. In such a case, the controller 150 may instruct the laser 110 to emit laser light, for implementing subsequent detection operation.

In other embodiments, the color shade of the object to be detected may be judged by means of other known means in prior arts, and then the detection operation of the detection apparatus 100 is controlled based on the judgment result.

According to an embodiment of the present disclosure, the detection apparatus 100 may further comprise one or more optical devices for configuring or guiding a light path between the laser 110 and the object 120 to be detected (hereinafter referred to as "laser light path"), a light path between the object 120 to be detected and the Raman spectrometer 130 (hereinafter referred to as "Raman light path"), and/or a light path between the imaging device 140 and the object 120 to be detected (hereinafter referred to as "imaging light path").

As shown in FIG. 1, the optical devices may include a first beam splitter 161 disposed in the Raman light path and configured to guide the laser light emitted from the laser 110 to the object 120 to be detected and to not block or adversely affect transmission of a light signal (Raman scattering light) from the object 120 to be detected to the Raman spectrometer 130.

As an example, the first beam splitter 161 may be a long-wavelength pass dichroic mirror. Long-wavelength pass dichroic mirror generally allows light having a wavelength greater than a predetermined wavelength to pass therethrough and reflects light having a wavelength smaller than the predetermined wavelength. In a case where a Raman scattering effect is excited by using laser light to irradiate the object to be detected, most of the Raman scattering light will decrease in frequency and increase in wavelength. Thus, the long-wavelength pass dichroic mirror may be suitably configured such that laser light emitted from the laser 110 and having a predetermined wavelength will be reflected towards the object 120 to be detected and that Raman scattering light coming from the object 120 to be detected and having an increased wavelength will be allowed to pass through the long-wavelength pass dichroic mirror to be transmitted towards the Raman spectrometer 130. Specific configuration of the long-wavelength pass dichroic mirror may be set according the wavelength of the laser light emitted by the laser 110.

Although in above examples, the long-wavelength pass dichroic mirror is described as an example of the first beam splitter 161, the first beam splitter 161 of the present disclosure is not only limited to the long-wavelength pass dichroic mirror, and the above function may be achieved by selecting the beam splitting member based on other known wavelength.

With provision of the first beam splitter 161, the laser light path and the Raman light path may be at least partly combined, thereby facilitating reduction of the overall dimension of the detection apparatus.

Further, as shown in FIG. 1, the optical devices may further comprise a second beam splitter 162, which is also disposed in the Raman light path and further configured to reflect visible light from the object to the imaging device 140 such that the object to be detected is imaged by the imaging device 140 and to allow the laser light emitted from the laser 110 and the Raman light from the object 120 to be detected to pass therethrough.

As an example, the second beam splitter 162 may also include a long-wavelength pass dichroic mirror. For example, if near-infrared laser light having a wavelength of 785 nm is used (that is, the laser 110 is configured to emit near-infrared laser light having a wavelength of 785 nm), and if a long-wavelength pass dichroic mirror is used as the second beam splitter 162, the second beam splitter 162 may reflect visible light, which generally having a wavelength in a range from 400 nm to 760 nm (or a range from 380 nm to 780 nm for a few people), while allowing infrared light having a wavelength greater than that of the visible light to pass therethrough. As such, imaging, by the imaging device 140, of the object to be detected will not be affected, and transmission of the laser light emitted by the laser 110 and the Raman scattering light from the object 120 to be detected will also not be affected. Specific threshold of the long-wavelength pass dichroic mirror may be set or configured as required (for example, based on parameters such as the wavelength of the laser light). In embodiments of the present disclosure, the second beam splitter 162 is not limited to the long-wavelength pass dichroic mirror, and the above function of the second beam splitter 162 may be achieved by selecting other known beam splitting members.

With provision of the second beam splitter 162, the imaging light path and the Raman light path may be at least partly combined, thereby facilitating reduction of the overall dimension of the detection apparatus.

It is noted that in the above embodiments, operational principle of the present disclosure are only described by way of examples, but the present disclosure is not limited to the above exemplary embodiment, and the first beam splitter 161 and the second beam splitter 162 are also not limited to the long-wavelength pass dichroic mirror. For example, in another embodiment, the laser 110 emits ultraviolet laser light, and in this case, the first beam splitter 161 is a long-wavelength pass dichroic mirror, while the second beam splitter 162 may be a short-wave pass dichroic mirror.

As shown in FIG. 1, in the Raman light path, the second beam splitter 162 is arranged closer to the object 120 to be detected than the first beam splitter 161 (that is, the second beam splitter 162 is arranged at an upstream side of the Raman light path, while the first beam splitter 161 is arranged at a downstream side of the Raman light path). However, the present disclosure is not limited to this specific arrangement. For example, if the laser 110 emits ultraviolet laser light, the second beam splitter 162 may be arranged at the downstream side of the Raman light path relative to the first beam splitter 161, and the second beam splitter 162 may be a short-wave pass dichroic mirror. In any case, it is ok as long as most of the visible light is reflected by the second beam splitter 162 and most of the Raman light is transmitted through the second beam splitter 162.

In another embodiment, the optical devices may further include one or more other optical members, in addition to the first beam splitter 161 and the second beam splitter 162.

For example, as shown in FIG. 1, the detection apparatus 100 may further comprise a first optical filter 163 disposed in the Raman light path at a position downstream of the first beam splitter 161 and configured to filter out Rayleigh light or other stray light from a light signal having passed through the first beam splitter 161, thereby reducing interference of the Rayleigh light or other stray light to the Raman spectrometer. In an exemplary embodiment, the first optical filter 163 may include a long wave-pass filter or a notch filter.

In a further embodiment, as shown in FIG. 1, the detection apparatus 100 may further comprise a second optical filter 164 disposed in the laser light path at a position upstream of the first beam splitter 161 (that is, between the laser 110 and the first beam splitter 161) and configured to limit a wavelength of the laser light emitted by the laser 110 within a desired wavelength band. In an exemplary embodiment, the second optical filter 164 may include a narrow band filter.

In a further embodiment, as shown in FIG. 1, the detection apparatus 100 may further comprise a third optical filter 165 disposed in the imaging light path at a position downstream of the second beam splitter 162 (that is, between the second beam splitter 162 and the imaging device 140) and configured to filter out stray laser light from the object 120, thereby avoiding unnecessary interference or damage to the imaging device. In an exemplary embodiment, for example, the third optical filter 165 may include a notch filter configured for filtering out stray light of the laser light during detection operation of the detection apparatus 100 so as to avoid the stray light entering and damaging the imaging device 140.

In a further embodiment, as shown in FIG. 1, the detection apparatus 100 may further comprise a first convergent lens or lens set 166 disposed between the second beam splitter 162 and the object 120 to be detected, a second convergent lens or lens set 167 disposed between the imaging device 140 and the second beam splitter 162, and/or a third convergent lens or lens set 168 disposed between the Raman spectrometer 130 and the first beam splitter 161. The first convergent lens or lens set 166 may be used for imaging of the object 120 by the imaging device 140, and also for collecting scattered Raman light from the object 120 such that more scattered Raman light may be transmitted to the Raman spectrometer, thereby facilitating improvement of sensitivity and accuracy of detection of the detection apparatus 100. The second convergent lens or lens set 167 may be used for imaging of the object 120 by the imaging device 140. The third convergent lens or lens set 168 may be used for converging light such that more scattered Raman light may be converged into the Raman spectrometer, thereby facilitating improvement of sensitivity and accuracy of detection of the detection apparatus 100.

Further, according to another embodiment, as shown in FIG. 1, the detection apparatus 100 may further comprise a lighting device 170 configured to provide illumination to the object 120 to be detected. Generally, the detection apparatus 100 has a detection end, and the object 120 to be detected is positioned closer to the detection end, and thus it is not possible to provide sufficient illumination to a portion to be detected of the object 120 by an external light source. Provision or integration of the lighting device 170 within the detection apparatus 100 will be favorable for the imaging device 140 to obtain a clear image of the object 120 to be detected. The lighting device 170 may be provided within the detection apparatus 100 at a position close to the detection end; for example, as shown in FIG. 1, the lighting device 170 may be arranged between the second beam splitter 162 and the object 120 to be detected, at a position upstream or downstream of the first convergent lens or lens set 166. In other embodiments, the lighting device may also be arranged at any suitable positions within the detection apparatus 100. The lighting device 170 may include, for example, one or more LED lamps.

According to another aspect of the present disclosure, there is further provided a detection method.

Figure 2:
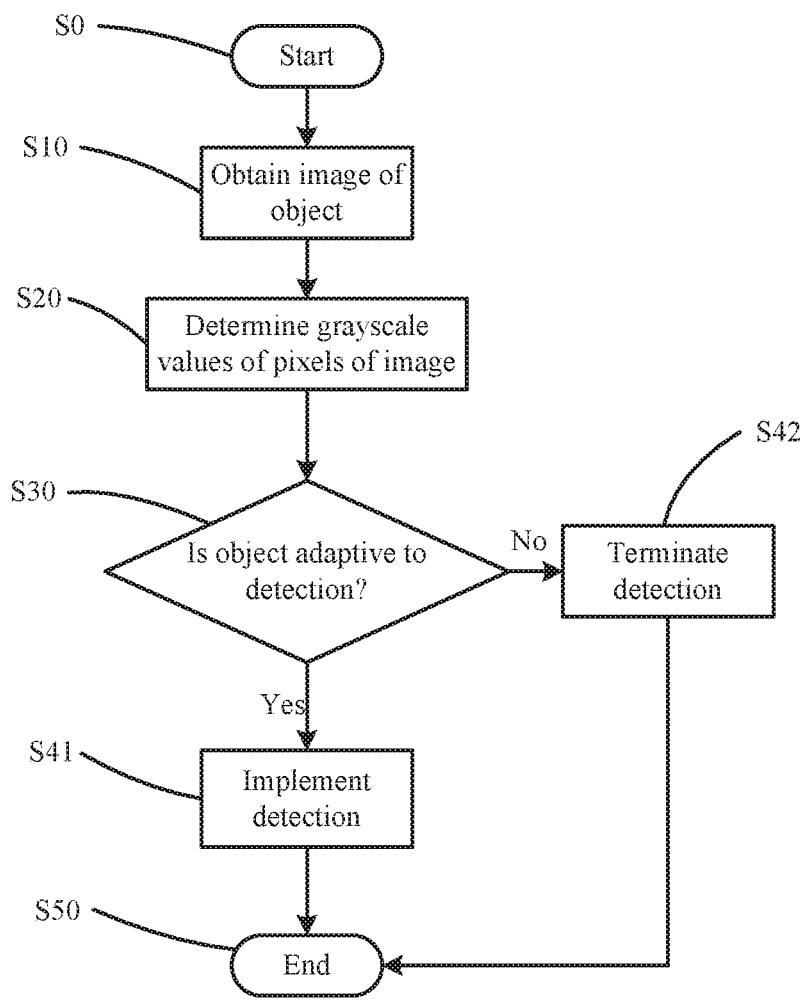
FIG. 2 is a flow chart schematically showing a detection method according to another embodiment of the present disclosure.

FIG. 2 is a flow chart schematically showing a Raman spectrum detection method according to an embodiment of the present disclosure. As shown in FIG. 2, after starting the detection apparatus 100 (step S0), the detection method may further include following steps:

step S10: obtaining an image of an object to be detected;
step S20: determining a grayscale value of each of pixels of the image;
step S30: determining, based on grayscale values of the pixels of the image, whether or not the object is adaptive to the detection;
step S41: implementing the detection if it is determined the object is adaptive to the detection; and
step S42: if it is determined the object is not adaptive to the detection, terminating the detection.

The operation of the detection apparatus 100 ends (step S50) after the detection is finished or terminated. Exemplarily, the detection may include a Raman spectrum detection to be implemented by using laser light from a laser to irradiate the object, or other detections to be implemented by using laser light to irradiate the object.

In an exemplary embodiment, the above steps may be specifically implemented in following ways.

In step S10, the image, for example, an optical image, of the object 120 to be detected may be obtained by the imaging device 140.

In step S20, an image processor may be used to process the image obtained by the imaging device 140 so as to obtain the grayscale value of each of the pixels in the image.

The step S30 may further comprise:

S31: comparing the grayscale value of each of the pixels with a preset grayscale threshold so as to determine a percentage (that is, a deep-colored pixel percentage) of the number of the pixels, grayscale values of which are smaller than the grayscale threshold, relative to a total pixel number of the image; and S32: comparing the deep-colored pixel percentage with a preset percentage threshold, and concluding that the object is not adaptive to the detection if the deep-colored pixel percentage is larger than the threshold percentage, and that the object is adaptive to the detection if the deep-colored pixel percentage is smaller than or equal to the threshold percentage.

In an alternative embodiment, the step S30 may further comprise:

S31': calculating an average grayscale value of all pixels of the image; and

S32': comparing the average grayscale value with a preset average grayscale threshold, and concluding that the object is not adaptive to the Raman spectrum detection if the average grayscale value is smaller than the average grayscale threshold, and that the object is adaptive to the Raman spectrum detection if the average grayscale value is greater than or equal to the average grayscale threshold.

In step S41, the controller 150 may instruct the laser 110 to emit laser light for implementing the Raman spectrum detection.

In step S42, the controller 150 may instruct the laser 110 to not emit laser light, to reduce a light emitting power of the laser, to shorten a time period of the laser for continuously emitting the laser light, or to terminate the detection operation. Further, the step S42 may further comprise instructing by the controller 150 an alarm device 160 to send an alarm signal.

The above detailed description has explained various embodiments of the above Raman spectrum inspection apparatus and monitoring method thereof by schematic views, flow charts and/or examples. In case that the schematic views, flow charts and/or examples each include one or more functions and/or operations, the skilled person in the art should understand that each function and/or operation in such schematic views, flow charts and/or examples may be implemented separately and/or collectively by various structures, hardware, software, firmware or any combination of them in essential. In an embodiment, some parts of the subject of the embodiment of the present disclosure may be implemented by Application Specific Integrated Circuits (ASIC), Field Programmable Gate Arrays (FPGA), Digital Signal Processors (DSP) or other integrated forms. However, the skilled person in the art should understand that some aspects of the embodiments disclosed herein may be implemented equally in the integrated circuit entirely or partly, implemented as one or more computer programs running on one or more computers (for example, implemented as one or more programs running on one or more computer systems), implemented as one or more programs running on one or more processors (for example, implemented as one or more programs running on one or more microprocessors), implemented as firmware, or implemented as any combination of the above methods in essential. From the present disclosure, the skilled person in the art has capability of designing circuits and/or writing software and/or firmware codes. Furthermore, the skilled person in the art will appreciate that the mechanism of the subject of the present disclosure may be delivered as various forms of program products, and the exemplified embodiments of the subject of the present disclosure may be applicable independent of the specific types of the signal carrying media that perform the delivery in practice. Examples of the signal carrying media include, but not limited to: recordable media, such as a floppy disc, a hard disk drive, an optical disc (CD, DVD), a digital magnetic tape, a computer memory or the like; and transmission media such as digital and/or analogue communication media (for example, an optical fiber cable, a wave guide, a wired communication link, a wireless communication link or the like).

Although exemplary embodiments of the present disclosure have been illustrated in the drawings, it will be understood by those skilled in the art that the present disclosure may be still implemented even if one or more unnecessary members/parts are omitted. Although several exemplary embodiments of the present disclosure have been described with reference to the drawings, it would be appreciated by those skilled in the art that modifications and variations may be made in these embodiments without departing from the principles and spirit of the general inventive concept of the present disclosure, the scope of which is defined in the appended claims and their equivalents.

What is claimed is:

1. A Raman spectrum detection apparatus, comprising:
   a laser configured to emit laser light to an object to be detected;
   an imaging device configured to obtain an image of the object;
   a Raman spectrometer configured to receive Raman light coming from the object and generated under irradiation of the laser light so as to obtain a Raman spectrum of the object; and
   a controller configured to control a detection operation of the detection apparatus by determining a color shade of the object based on grayscales of the image.

2. The detection apparatus according to claim 1, wherein the controller is further configured to:
   determine, based on the image, a grayscale value of each of pixels of the image;
   compare the grayscale value of each of the pixels with a preset grayscale threshold; and
   control the detection operation of the detection apparatus based on a comparison result.

3. The detection apparatus according to claim 2, wherein the controller is further configured to:
   determine a percentage of the number of the pixels, grayscale values of which are smaller than the grayscale threshold, with respect to a total pixel number of the image; and
   compare the determined percentage with a preset percentage threshold, and control the detection operation of the detection apparatus based on a comparison result.

4. The detection apparatus according to claim 1, wherein the controller is further configured to:
   determine, based on the image, a grayscale value of each of pixels of the image;
   calculate an average grayscale value of all pixels of the image based on the grayscale values of the pixels; and
   compare the average grayscale value with a preset average grayscale threshold, and control the detection operation of the detection apparatus based on a comparison result.

5. The detection apparatus according to claim 1, wherein the detection apparatus further comprises:
   a first beam splitter disposed in a Raman light path from the object to the Raman spectrometer, and configured to guide the laser light emitted from the laser to the object and to transmit therethrough the Raman light from the object to the Raman spectrometer.

6. The detection apparatus according to claim 5, wherein the first beam splitter includes a long-wavelength pass dichroic mirror.

7. The detection apparatus according to claim 4, wherein the detection apparatus further comprises:
   a second beam splitter disposed in a Raman light path from the object to the Raman spectrometer, and configured to reflect visible light from the object to the imaging device such that the object is imaged by the imaging device and to allow the laser light emitted from the laser and the Raman light from the object to pass therethrough.

8. The detection apparatus according to claim 7, wherein the second beam splitter includes a long-wavelength pass dichroic mirror.

9. The detection apparatus according to claim 7, wherein the detection apparatus further comprises at least one of following optical members:
   a first optical filter disposed in the Raman light path at a position downstream of the first beam splitter and the second beam splitter, and configured to filter out Rayleigh light of a light signal;
   a second optical filter disposed between the laser and the first beam splitter and configured to limit a wavelength of the laser light emitted by the laser within a desired wavelength band; and
   a third optical filter disposed between the imaging device and the second beam splitter and configured to filter out laser light from the object.

10. The detection apparatus according to claim 7, wherein the detection apparatus further comprises at least one of following optical members:
    a first convergent lens or lens set disposed between the second beam splitter and the object;
    a second convergent lens or lens set disposed between the imaging device and the second beam splitter; and
    a third convergent lens or lens set disposed between the Raman spectrometer and the first beam splitter.

11. The detection apparatus according to claim 1, wherein the detection apparatus further comprises:
    a light source configured to illuminate the object.

12. A method of detecting a Raman spectrum of an object, comprising steps of:
    obtaining an image of an object to be detected;
    determining a grayscale value of each of pixels of the image;
    determining, by determining a color shade of the object based on grayscale values of the pixels of the image, whether or not the object is adaptive to a Raman spectrum detection to be implemented by irradiating the object by laser light;
    implementing the Raman spectrum detection if it is determined that the object is adaptive to the Raman spectrum detection; and
    if it is determined the object is not adaptive to the Raman spectrum detection, terminating the Raman spectrum detection, or adjusting a detection parameter for the Raman spectrum detection such that the object is adaptive to the Raman spectrum detection with the adjusted detection parameter.

13. The method according to claim 12, wherein the step of determining, based on grayscale values of the pixels of the image, whether or not the object is adaptive to a Raman spectrum detection to be implemented by irradiating the object by laser light comprises:

comparing the grayscale value of each of the pixels with a preset grayscale threshold so as to determine a deep-colored pixel percentage of the image, which is a percentage of the number of the pixels with grayscale values smaller than the grayscale threshold, with respect to a total pixel number of the image; and comparing the deep-colored pixel percentage with a preset percentage threshold, and concluding that the object is not adaptive to the Raman spectrum detection if the deep-colored pixel percentage is larger than the preset percentage threshold, and that the object is adaptive to the Raman spectrum detection if the deep-colored pixel percentage is smaller than or equal to the preset percentage threshold.

14. The method according to claim 12, wherein the step of determining, based on grayscale values of the pixels of the image, whether or not the object is adaptive to a Raman spectrum detection to be implemented by irradiating the object by laser light comprises:

calculating an average grayscale value of all pixels of the image; and comparing the average grayscale value with a preset average grayscale threshold, and concluding that the object is not adaptive to the Raman spectrum detection if the average grayscale value is smaller than the preset average grayscale threshold, and that the object is adaptive to the Raman spectrum detection if the average grayscale value is greater than or equal to the preset average grayscale threshold.

15. The method according to claim 12, further comprising:

sending an alarm signal if it is determined that the object is not adaptive to the Raman spectrum detection.

16. The method according to claim 12, wherein the step of adjusting a detection parameter for the Raman spectrum detection comprises:

reducing light emitting power of the laser for generating the laser light; and/or shortening a time period of the laser for continuously emitting the laser light.

17. The detection apparatus according to claim 2, wherein the detection apparatus further comprises:

a first beam splitter disposed in a Raman light path from the object to the Raman spectrometer, and configured to guide the laser light emitted from the laser to the object and to transmit therethrough the Raman light from the object to the Raman spectrometer.

18. The detection apparatus according to claim 3, wherein the detection apparatus further comprises:

a first beam splitter disposed in a Raman light path from the object to the Raman spectrometer, and configured to guide the laser light emitted from the laser to the object and to transmit therethrough the Raman light from the object to the Raman spectrometer.

19. The detection apparatus according to claim 4, wherein the detection apparatus further comprises:

a first beam splitter disposed in a Raman light path from the object to the Raman spectrometer, and configured to guide the laser light emitted from the laser to the object and to transmit therethrough the Raman light from the object to the Raman spectrometer.

20. The method according to claim 13, further comprising:

sending an alarm signal if it is determined that the object is not adaptive to the Raman spectrum detection.

* * * * *